United States Patent [19]
Heasley et al.

[11] 3,980,393
[45] Sept. 14, 1976

[54] RETROREFLECTIVE DEVICE

[75] Inventors: James H. Heasley, Shaker Heights; Alan G. King, Macedonia, both of Ohio

[73] Assignee: Ferro Corporation, Cleveland, Ohio

[22] Filed: Mar. 10, 1975

[21] Appl. No.: 556,955

[52] U.S. Cl. ................................. 350/103; 404/12; 350/97; 350/99
[51] Int. Cl.² ........................................ G02B 5/124
[58] Field of Search .......... 350/102, 103, 105, 276, 350/109, 97, 100, 99; 404/12, 13, 14

[56] References Cited
UNITED STATES PATENTS

| | | | |
|---|---|---|---|
| 2,067,701 | 1/1937 | James | 350/103 |
| 2,161,842 | 12/1936 | Allison, Sr. | 350/103 |
| 2,360,480 | 4/1941 | Dickson | 350/102 |
| 3,396,639 | 8/1968 | Lemelson | 404/14 |
| 3,587,416 | 6/1971 | Flanagan | 350/103 |

*Primary Examiner*—John K. Corbin
*Assistant Examiner*—B. Wm. delos Reyes
*Attorney, Agent, or Firm*—Milton L. Simmons; Wesley B. Taylor

[57] ABSTRACT

A retroreflective device is disclosed comprising a convex-concavo lens having a cube-corner array extending across its concavity. The device returns in the same direction from which it is received a large proportion of incident light. The lens body is adapted with respect to reflected light to indicate a larger than actual area of the cube-corner array. The retroreflective device may be used as a marker, such as a roadmarker, the convex side of the lens body being exposed to receive the incident light.

10 Claims, 8 Drawing Figures

U.S. Patent  Sept. 14, 1976  3,980,393
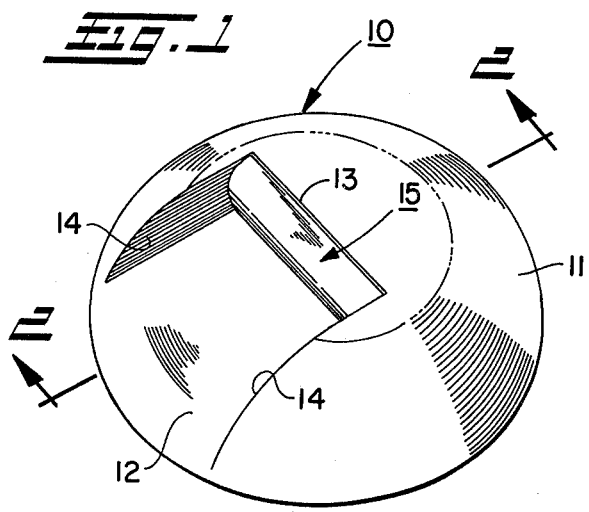
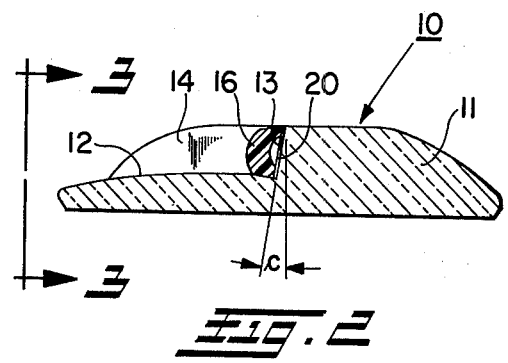
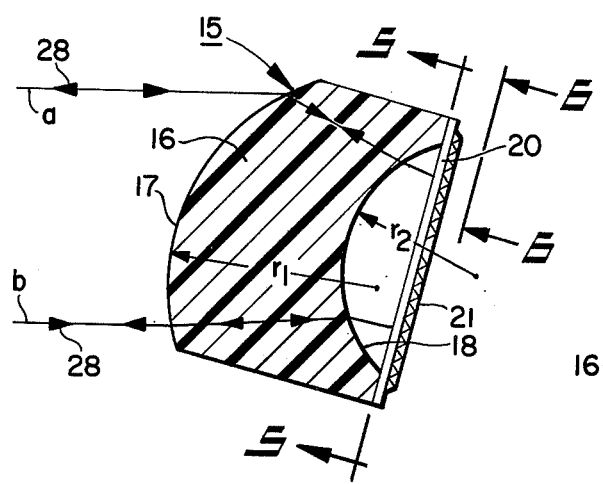
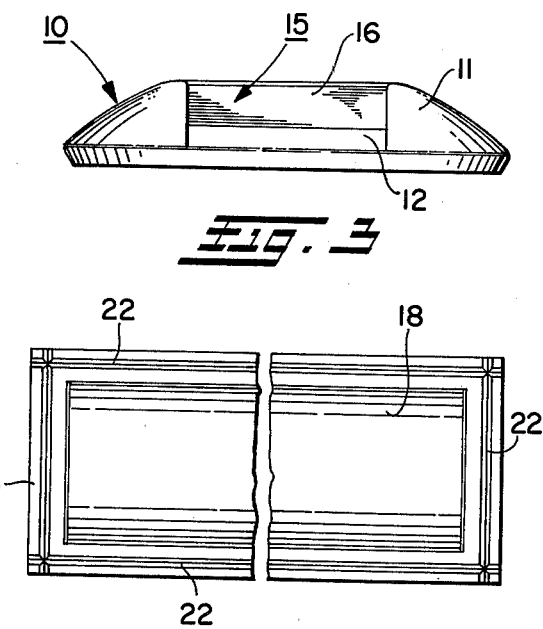
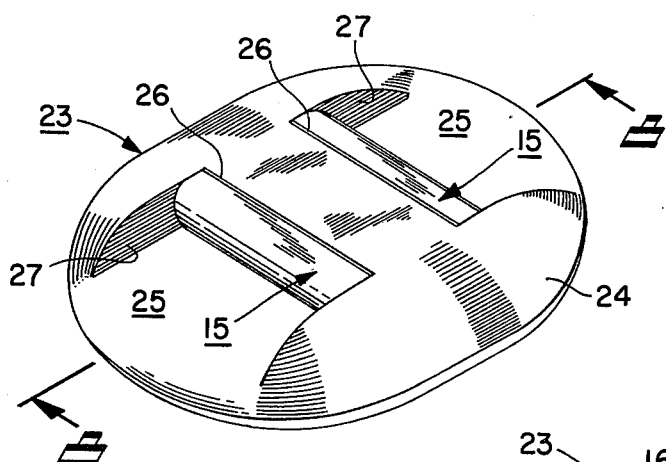
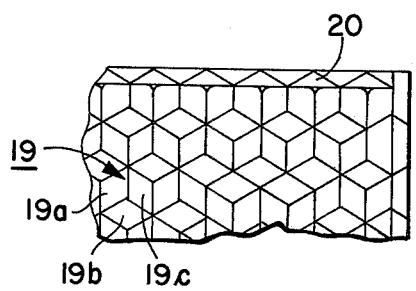
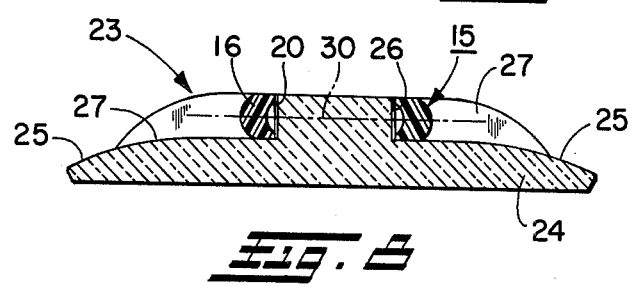

RETROREFLECTIVE DEVICE

BACKGROUND OF THE INVENTION

This invention relates to a retroreflective device which may be used wherever light reflection is desired. A principal application of the device is as a marker, and especially as a roadmarker, to provide directional guidance and therefore is described with respect to this use.

Roadmarkers are mounted on the surface of a roadway, such as along its center line or shoulders, to delineate paths or lanes for traffic, or at intersections to define stopping lines or cross-lanes for traffic, both vehicular and pedestrian. Markers of this type are mounted in spaced apart relation and serve to guide traffic in following or traversing a roadway, or in following a curve or grade in the roadway. Particularly to assist a driver of a vehicle at night, these markers have light reflectors which catch and return pencils of light from vehicle headlights back toward the source of the light. Since automobiles of recent vintage have quite powerful headlights, the use of roadmarkers has become more widespread. Roadmarkers contribute to traffic safety such as when roads are wet from rain. Under certain conditions, such as fog, roadmarkers can be the only means of orienting a driver to a changing direction of a road.

Many forms of light reflectors have been suggested. They usually suffer from one or more limitations, such as reflecting too small a proportion of incident light while an approaching vehicle is still at an appreciable distance. As a result, reflecting markers are often noticed too late by a driver to be of substantial help.

Further, in order to avoid making a roadmarker an obstruction on the road, the marker preferably is designed to protrude from the road only a slight amount. This requirement augments problems of light reflection. Plain ceramic or plastic markers have been used, but they tend only to scatter the light. Light scattering is self-defeating in that it is accompanied by losses of intensity of the reflected light which materially reduce the effectiveness of the marker.

An effective reflecting system that has become increasingly popular is a well known triple mirror reflex reflecting principle, such as is disclosed in U.S. Pat. No. 1,671,086 to Stimson, and which is referred to in the art as a cube-corner structure, hereinafter more fully described. While a cube-corner structure provides satisfactory performance as to light striking perpendicularly against an array or strip of cube-corners, that is, parallel to the axes of the cube-corners, this performance falls off rapidly in quality as incident light enters at angles away from the normal to the surface of the cube-corner array. Accordingly, it was previously thought impractical to use a cube-corner structure with a collecting lens system where most of the incidental light would strike a cube-corner structure from many angular directions other than one parallel to the cube-corner axes. Additionally, a cube-corner structure is relatively more expensive than other types of light reflectors such as those embodying rounded beads, so that in manufacturing thousands of markers, the total area of a cube-corner array becomes a factor. Consequently, the area of a given tape or strip of a cube-corner array for each marker is generally minimized as much as possible, although the overall performance of a marker may suffer as a result.

While, as indicated, a roadmarker should not extend so far above the level of a road as to become an obstruction to travel, a related problem arises in that a marker of even small vertical elevation tends to accumulate soil, dirt and debris of all kinds around its periphery. When the accumulation blinds the reflector system of the marker, obviously its function is temporarily but effectively destroyed. It is, therefore, important that a roadmarker fairly readily shed any dirt or debris that tends to accumulate over its light reflecting system and protect its reflecting system from road damage.

SUMMARY OF THE INVENTION

The present invention is a retroreflective device embodying a preferred cube-corner array in which the effective reflective area of the array appears to be larger than is actually the case. A lens system used in conjunction with the cube-corner array collects, concentrates, and directs incidental light against the tape in directions substantially parallel to the axes of the cube-corners of the array, so that the amount of light reflection in a general opposite direction back to the original source of light is optimized.

In particular, the present lens system is designed to converge light entering at a front convex surface and diverge the light leaving at a back concave surface a sufficient amount again to place the pencils of light in parallel relation but as a narrower beam. The lens system, therefore, acts telescopically to bring parallel light as a narrower beam against the cube-corner array and in directions parallel to the axes of the cube-corners. This, in turn, increases the light gathering power of the cube-corner array and provides increased retroreflectivity for the device. An exposed convex side of the lens system aids in preventing accumulation of dirt and debris in front of the lens system.

More particularly, the retroreflective device comprises a convex-concavo lens having a cube-corner array directed across its concavity. In one form, the device comprises a light-transmitting lens body having on opposed sides a convex surface and a concave surface. A reflecting cube-corner array, such as a tape or strip of cube-corners, is mounted adjacent the concave surface and directed across the concavity thereof. The convex side of the lens body is exposed to receive incidental light. Preferably, the radii of the convex and concave surfaces are so related as to converge light entering the convex surface and to diverge light leaving the concave surface into directions substantially parallel to the axes of the cube-corners of the array. In this manner, the lens body is adapted with respect to reflected light to indicate a larger than actual area of the cube-corner array. The centers of curvature of the convex and concave surfaces may have the same or different vertical elevations with respect to each other to meet diverse demands of use.

BRIEF DESCRIPTION OF THE DRAWING

In the accompanying drawing:

FIG. 1 is a perspective view of a roadmarker embodying the present retroreflective device;

FIG. 2 is a center longitudinal section of FIG. 1 on the line 2—2;

FIG. 3 is a view of the marker of FIG. 2 on the plane of line 3—3;

FIG. 4 is a fragmentary, enlarged view of the lens and cube-corner array or strip of FIG. 2, the angle from the vertical being accentuated for purposes of illustration;

FIG. 5 is a section of FIG. 4 on the line 5—5 and shows a periphery of a lens body as it appears prior to adherence to a cube-corner strip;

FIG. 6 is a fragmentary, enlarged plan view of a cube-corner array;

FIG. 7 is a perspective view of a modified form of a roadmarker embodying the present retroreflective device; and FIG. 8 is a center longitudinal section of FIG. 7 on line 8—8.

DESCRIPTION OF THE PREFERRED EMBODIMENTS

Referring to the drawings and intially to the embodiment of FIGS. 1 through 6, a roadmarker generally indicated at 10 comprises a circular ceramic disc 11 having a truncated, rounded top provided with a cut-away section which defines a sloping bottom 12 and an abutment wall 13 with adjoining side walls 14. Nestled between the side walls and lodged against the abutment wall lies a retroreflective device of the present invention, generally represented at 15. The disc 11 may be suitably molded from any known ceramic, glazed and pigmented if desired to impart color, or from any other durable, weather-resistant material.

As shown best in FIGS. 2 and 4, the retroreflective device includes a light-transmitting lens body 16 having on opposite sides a convex surface 17 and a concave surface 18. The lens body may be fabricated from any durable, light-transmitting, weather-resistant material, such as glass, but preferably is made from synthetic resins such as polycarbonates but especially from the acrylates like polymethacrylate and polymethymethacrylate resins. The lens body may be tinted, if desired, to reflect red or yellow light. A tape or strip 20 of cube-corners is secured to the side of lens body 16 having the concavity and extends thereacross. The cube-corner tape is an article of commerce and can be purchased as such. The term cube-corner is an art recognized term and refers to a well known triple mirror reflex reflecting principal as described, for example, in U.S. Pat. No. 1,671,086 to Stimson. If three reflecting surfaces are arranged at right angles to each other and intersect at a common point, they form the inside corner of a cube or trihedral corner. A beam of light incident on such a cube-corner is reflected from surface to surface and then back along the same general direction taken by the arriving light beam. Such a construction may also be termed a central triple reflector.

Each cube-corner has an axis and the axes of all the cube-corners are generally parallel to one another. Although such axes are preferably parallel to each other, this does not mean that the axes must be normal to a tape or array of cube-corners as shown, for example, by U.S. Pat. No. 3,332,327 to Heenan. Processes and apparatus for making cube-corners are also described in U.S. Pat. Nos. 1,591,572 and 1,906,655, both issued to Stimson. The disclosures of the patents herein cited are hereby incorporated by reference. FIG. 6 shows in plan view the nature of one cube-corner reflector. Each cube-corner such as that represented at 19 has three reflecting surfaces, 19a, 19b and 19c, disposed at right angles to each other and intersecting at a common point. It is understood that this illustrates only one example of a cube-corner of which other configurations and spacings are possible.

The back of cube-corner tape 20 remote from the concave surface 18 can be metallized in a known manner to increase reflection. Aluminum is the preferred metal for this purpose. In place of metallization and preferable to it, a plastic cover 21 is laid across the cube-corners and sealed to the tape along their common edges. The nature of cover 21 is not important, for it is intended only to close the open air pockets between the cube-corners which are exposed on that side of tape 20. The cover may, therefore, be a thermoplastic resin, such as polymethacralate or a linear polyester, and heat-sealed to the edges of tape 20.

Tape 20, with or without a cover 21, is suitably secured over the concavity to lens body 16 along the edges of tape 20 by any suitable means. Adhesives may be used such a natural adhesives like glue, bitumen, etc., or resinous adhesives like epoxy, polyester, or polyurethan resins. However, a preferred technique involves the use of ultrasonic waves melting a fusible portion of the lens body. FIG. 5, for instance, is a view of the concave side of lens body 16 prior to the time a cube-corner tape is secured to it. Body 16 is molded with a triangularly shaped rim 22 extending around the lens body between the concave surface 18 and the perimeter of body 16. When tape 20 is placed against the peripheral portion of the lens body shown in FIG. 5 and ultrasonic waves are directed against rim 22 in a manner known in the art, the rim fuses because of its thermoplastic nature and forms its own adhesive to fix tape 20 against lens body 16.

As illustrated in FIG. 2, the retroreflective device fits against abutment wall 13 and has a sufficient length to sit snugly between the two side walls 14. Any adhesive may be used to secure the retroreflective device in this position. The adhesive may coat the back of tape 20 and the bottom and ends of lens body 16, but should not contact convex surface 17. The adhesive can be any of those known in the art including those previously mentioned with respect to securing cover 21 to tape 20. Indeed the same adhesives can be used to secure roadmarker 10, as well as the roadmarker of of FIGS. 7 and 8 hereinafter described, to a surface of a road, although catalyzed thermosetting adhesives are preferred for this purpose.

While the roadmarker of FIG. 1 is designed to receive and reflect light from one direction, the roadmarker of FIG. 7 is designed to receive and reflect light from two opposite directions. Referring to FIGS. 7 and 8, a roadmarker generally indicated at 23 comprises an oval shaped, ceramic disc 24 having a truncated, rounded top like roadmarker 10 of FIG. 1. However, in this case, there are two opposed, cut-away sections, each leaving a sloping bottom 25 and defining an abutment wall 26 with adjacent side walls 27. The retroreflective device may be the same or similar to that shown in FIG. 1 and is therefore indicated by the same reference numeral 15. The same class of adhesives may be used to secure retroreflective unit 15 against abutment wall 26 and between side walls 27 as was described with respect to securing retroreflective unit 15 to roadmarker 10. The embodiment of FIGS. 7 and 8 is used when it is desired to reflect light in two, opposing directions, such as in forming a center dividing line of a road.

The embodiments of FIGS. 1 and 7 illustrate still another aspect of the present invention unrelated as to whether the retroreflective device is incorporated in a uni-directional or bi-directional marker. FIG. 4 diagramatically illustrates the retroreflection action of light by a device of the present invention. If $a$ and $b$ represent two isolated beams or pencils of light, upon striking lens body 16 each beam is refracted in a direction toward the center of the body by convex surface 17. Conversely, upon leaving lens body 16, each beam is refracted away from the center of the body by concave surface 18. It will, therefore, be noted that beams $a$ and $b$ are brought physically closer than when initially striking the convex surface of lens body 16 so as to produce a more concentrated total beam. Moreover, ideally beams $a$ and $b$ are brought into substantial parallelism in leaving concave surface 18 not only as between themselves, but also into substantial parallelism with the axes of the cube-corners of tape 20. This achieves maximum reflection with an array of cube-corners, so that the light rays are reflected and then refracted back toward the original source of light and along substantially the same identical path. This is represented in FIG. 4 by use of double and opposing arrowheads 28.

The optimum conditions just described may be achieved by correlating the radii of curvatures of the convex and concave surfaces, the magnitudes of which can be easily determined by simple trial and error. The following equation can also be used, in general, to calculate a telescoping lens:

$$r_1 - r_2 = \frac{(n-1)t}{n}$$

in which $r_1$ is the radius of the convex surface 17, $r_2$ is the radius of the concave surface 18, $n$ is the index of refraction of the lens body 16, and $t$ is the lens thickness measured between the intersection of the convex and concave surfaces along the axis of the lens.

However, strict application of this formula has not been found to be necessary or even advantageous. For example, the formula does not take into account spherical aberration. Moreover, the equation assumes that the centers of radii, $r_1$ and $r_2$, are on the same plane as the measured thickness, $t$ of the lens body. This also has not been found to be necessary or even advantageous.

Reverting to the embodiment of FIGS. 1 and 7, although as previously indicated, the concentrated light beams preferably strike tape 20 in substantial parallelism with the axes of its cube-corners, this does not mean that the tape itself must lie strictly in a vertical plane. As shown in FIGS. 2 and 4, abutment wall 13 or roadmarker 10 is inclined from the vertical in a downward direction toward retroreflective device 15 through an angle $c$. This causes the device to assume an angled posture indicated in FIG. 4. In this instance, the center of curvature of the concave surface 18 is elevated with respect to the center of curvature of convex surface 17 as indicated in FIG. 4 by the respective radii, $r_1$ and $r_2$.

There are several reasons why the slanted position of FIG. 4 is advantageous for the retroreflective device. For one, this position provides easy release of a roadmarker from a mold through use of angle $c$ which becomes a draft angle in the molding form. Further, incident light intended to be intercepted by the retroreflective device may not always be parallel to the horizon (or roadway), nor perpendicular to a tape of cube-corners disposed in a truly vertical plane. By tilting the retroreflective device backward as illustrated in FIG. 4, the device is more apt to intercept light emanating from a relatively high position off a roadway and direct it back to the original source. In one specific installation of the type of roadmarker shown in FIG. 4, $r_1$ was 0.25 inch, $r_2$ was 0.175 inch, $n$ was 1.491, thickness $t$ was 0.228 inch, and angle $c$ was 6°. The performance of the retroreflective device was not sensitive to small variations in the dimensions given, such that they could be altered and still obtain excellent if not maximum efficiency in retroreflection. Raising the center of curvature of the concave surface 18 (the center for $r_2$) above the center of curvature for the convex surface 16 (center of $r_1$) causes light reflected by the present device to remain parallel but to be bent downwardly. By proper choice of the vertical off-set distance between the two centers of curvature, the light can be bent through the required angle equal or substantially equal to $c$.

The centers of curvature of convex surface 17 and concave surface 18 need not have different vertical elevations. The embodiment of FIG. 7 and 8 shows that the abutment walls 26 can be truly vertical. In this case, the centers of curvature for the convex and concave surfaces lie substantially on the same horizontal plane as illustrated by the imaginary plane 30 in FIG. 8. In this embodiment, tape 20 of retroreflective unit 15 is preferably perpendicular to light beams entering lens body 16.

A prismatic system, in which flat sides are used, cannot be suitably substituted for the curved lens system of the present invention. If a prismatic collector were used in the present device, at minimum tape area the front or receiving face of the prism must be nearly vertical to bring the light in directions normal to the cube-corner tape. In time, this front face would collect dirt and debris and its top edge would be subject to very rapid abrasion. If, to avoid these shortcomings, the front face of the prism were slanted backwardly, the area required for the reflective tape would increase substantially. Accordingly, it is not practical to construct a sound economical design using a prismatic collector in the present environment.

In contrast, the present retroreflective device provides maximum efficiency for retroreflection of light while the exposed curved convex surface 17 readily sheds any dirt and debris that may accumulate. It has also been found that the drop-off in retroreflectivity with increasing divergence angle is considerably less with the present retroreflective device than with a cube-corner tape alone. For instance, one test lens and corner-cube tape assembly had a reflectance of specific intensity equal to 3.9 to an entrance angle of 0° and a specific intensity of 2.2 at an entrance angle of 20°, thereby retaining 56 percent of its reflectance. Other sizes, radii, and placements for the centers of curvature are possible to form a telescoping lens in the present retroreflective device. While the lens body has been shown as a cylindrical lens, it will be understood that the lens body can also be a spherical lens as long as the convex-concavo relation is maintained as described.

Although the foregoing describes several embodiments of the present invention, it is understood that the invention may be practiced in still other forms within the scope of the following claims.

We claim:
1. A retroreflective device comprising a lens having a front convex surface and a rear concave surface and, having a cube-corner array directed across its concavity, the radii of said convex and concave surfaces being different and so related as to converge light entering the convex surface and to diverge light leaving the concave surface into directions substantially parallel to the axes of the cube-corners of said array.

2. The device of claim 1 in which said cube-corner array is spaced from the concavity.

3. A retroreflective device comprising a light-transmitting lens body having on opposed sides a convex surface and a concave surface, and a reflecting cube-corner array adjacent the concave surface and directed across the concavity thereof, the lens body being adapted with respect to reflected light to indicate a larger than actual area of said cube-corner array, the radii of said convex and concave surfaces being different and so related as to converge light entering the convex surface and to diverge light leaving the concave surface into directions substantially parallel to the axes of the cube-corners of said array, and the axes of said cube-corners being substantially parallel to each other.

4. The device of claim 3 in which said cube-corner array comprises a tape member secured to the surface of the lens body having the concavity and extending thereacross.

5. The device of claim 3 in which the device is mounted on a support, and the convex side of said lens body is disposed to receive incidental light.

6. A light-reflecting marker comprising a base support, an abutment member rising from the support, and a retroreflective device mounted over the support and adjacent the abutment member, said retroreflective device comprising a light-transmitting lens body having on opposed sides a convex surface and a concave surface, and a reflecting cube-corner array secured to the surface on the lens body having the concavity and directed thereacross, the lens body being adapted with respect to reflective light to indicate a larger than actual area of said cube corner array, the radii of said convex and concave surfaces being different and so related as to converge light entering the convex surface and to diverge light leaving the concave surface into directions substantialy parallel to axes of the cube-corners of said array, so that light reflected by the cube-corner array follows a return path substantially reverse to that defined.

7. The marker of claim 6 in which said abutment member has a wall contacting said retroreflective device, said wall is inclined from the vertical in a downward direction toward the lens body, and the center of curvature of the concave surface is elevated with respect to the center of curvature of the convex surface.

8. The marker of claim 6 in which said abutment member has a substantially vertical wall contacting said retroreflective device, and the centers of curvature of the convex and concave surfaces are substantially on the same horizontal plane.

9. The marker of claim 6 in which said cube-corner array is spaced from the concavity.

10. The marker of claim 6 in which the axes of the cube-corners are substantially parallel to each other.

* * * * *